(12) United States Patent
Robinson et al.

(10) Patent No.: US 7,424,403 B2
(45) Date of Patent: Sep. 9, 2008

(54) LOW POWER VIBRATION SENSOR AND WIRELESS TRANSMITTER SYSTEM

(75) Inventors: James C. Robinson, Knoxville, TN (US); Joseph C. Baldwin, Knoxville, TN (US); James W. Walker, Knoxville, TN (US); William E. Childress, Andersonville, TN (US)

(73) Assignee: CSI Technology, Inc., Wilmington, DE (US)

( * ) Notice: Subject to any disclaimer, the term of this patent is extended or adjusted under 35 U.S.C. 154(b) by 0 days.

(21) Appl. No.: 11/627,476

(22) Filed: Jan. 26, 2007

(65) Prior Publication Data

US 2008/0082296 A1  Apr. 3, 2008

Related U.S. Application Data

(60) Provisional application No. 60/827,584, filed on Sep. 29, 2006.

(51) Int. Cl.
*G06F 19/00* (2006.01)
*G06F 17/40* (2006.01)

(52) U.S. Cl. .............................. 702/189; 73/66; 73/570; 340/3.1; 340/500; 340/679; 340/683; 340/870.01; 340/870.07; 702/33; 702/34; 702/187; 702/188

(58) Field of Classification Search .................. 73/66, 73/457, 570; 340/3.1, 3.43, 500, 539.1, 539.22, 340/679, 683, 870.01, 870.07, 870.16; 702/33, 702/34, 35, 127, 182, 187, 188, 189, 198
See application file for complete search history.

(56) References Cited

U.S. PATENT DOCUMENTS 5,319,576 A * 6/1994 Iannadrea .................... 702/130

5,438,882 A   8/1995 Karim-Panahi et al.

(Continued)

FOREIGN PATENT DOCUMENTS

EP   1164377   12/2001

(Continued)

OTHER PUBLICATIONS

Costa Yiannakakis, Implementing a Wireless Vibration Surveillance System at a Combined Cycle Power Plant, ICM-2003 Conference, www.techkor.com.

(Continued)

*Primary Examiner*—Edward R Cosimano
(74) *Attorney, Agent, or Firm*—Luedeka, Neely & Graham, P.C.

(57) ABSTRACT

A low power vibration sensor and wireless transmitter system has one or more sensors that sense parameters of a machine including vibration and produces dynamic signals representing the sensed parameters. The system converts the signals to a digital format, digitally filters the signals, and processes the signals. A processor determines a plurality of levels, which represent the characteristics of the signal such as the peak value of a predetermined set of data points of the digital signal. Together, the levels comprise a PeakVue waveform. The processor determines the peak level value for the PeakVue waveform. Also, a true root-mean-square is calculated as the signal is received at the processor. The peak level and the RMS value are communicated wirelessly by a communication module to a control protocol network such as a daisy chain HART or Fieldbus protocol network. The system power supply and the communication module power supply are separate and allow for low power operation.

21 Claims, 3 Drawing Sheets

U.S. PATENT DOCUMENTS

| | | | |
|---|---|---|---|
| 5,663,504 | A | 9/1997 | Kluft |
| 5,854,994 | A | 12/1998 | Canada et al. |
| 5,895,857 | A | 4/1999 | Robinson et al. |
| 5,907,491 | A | 5/1999 | Canada et al. |
| 5,965,819 | A | 10/1999 | Piety et al. |
| 6,017,143 | A * | 1/2000 | Eryurek et al. ............... 700/51 |
| 6,507,804 | B1 | 1/2003 | Hala et al. |
| 6,549,869 | B1 | 4/2003 | Piety et al. |
| 6,738,697 | B2 | 5/2004 | Breed |
| 6,889,553 | B2 | 5/2005 | Robinson et al. |
| 6,950,766 | B2 * | 9/2005 | Okamoto et al. ............. 702/81 |
| 7,034,711 | B2 * | 4/2006 | Sakatani et al. .......... 340/686.1 |
| 2003/0030565 | A1 * | 2/2003 | Sakatani et al. ............. 340/679 |
| 2003/0200060 | A1 | 10/2003 | Eryurek et al. |
| 2004/0019461 | A1 * | 1/2004 | Bouse et al. ................ 702/188 |
| 2004/0098911 | A1 * | 5/2004 | Okamoto et al. ......... 47/58.1 R |
| 2004/0250623 | A1 | 12/2004 | Walker et al. |
| 2005/0011266 | A1 | 1/2005 | Robinson et al. |

OTHER PUBLICATIONS

Christopher McLean et al., Wireless Data gathering System for Condition Based Maintenance, 7th Annual Reliability Conference, www.techkor.com.

Improve Your Vibration Monitoring Program With Efficient and Reliable Data Collection, Techkor Instrumentation, www.techkor.com.

Wireless condition Monitoring Sensors; Not Just For Difficult Applications, www.techkor.com.

Description of PeakVue and Illustration of Its Wide Array of Applications In Fault Detection and Problem Severity Assessment, Emerson Process Management Reliability Conference 2001, Oct. 22-25, 2001, James Robinson, James Berry, <http://www.compsys.com/drknow/aplpapr.nsf/06b6f5a4de2eae6285256a3f004d9758/ce81d053dc6b396985256b20005fa041?$FILE/PeakVue%20Reliability%202001%20Conference.PDF>[Accessed Nov. 28, 2007].

Optimising Process Equipment Performance, Todd Reeves, Emerson Process Management, PTQ Q3 2005, (<http://www.mhm.assetweb.com/files/9210/Emerson%20with%201%20Ad.pdf>)[Accessed Nov. 28, 2007].

* cited by examiner

LOW POWER VIBRATION SENSOR AND WIRELESS TRANSMITTER SYSTEM

CROSS REFERENCES TO RELATED APPLICATIONS

This patent application claims priority from and is related to expired U.S. Provisional Patent Application Ser. No. 60/827,584 filed Sep. 29, 2006, entitled: "Vibration Transmitter Wireless Sensor". This U.S. Provisional Patent Application is incorporated by reference in its entirety herein.

FIELD

This invention relates to the field of wireless vibration analysis. More particularly, this invention relates to a low power vibration sensor and wireless transmitter.

BACKGROUND AND SUMMARY

A parameter of a machine such as vibration may be measured and analyzed to monitor machine health. A parameter is used herein to refer to a physical property or other thing that is typically measurable such as vibration, pressure, voltage, current, temperature and the like. Vibration sensing instruments have been used to determine faults in machine function by detecting abnormalities in vibration, which correlates to different types of machine faults.

Typically, vibration measurement devices require significant power supplies, memories, and bulk data transfer capabilities. The power supply is used to power vibration sensors, other sensors such as temperature or pressure sensors, power regulators, a processor, a memory, and a communicator. As vibration waveforms generated by vibration sensors enter the devices, the waveforms must be stored in a memory. Such bulk vibration waveforms typically require large memory capacities for storage. Then, the waveforms are often transmitted in entirety or without significant compression to an outside system for machine health analysis. Also, network connections must accommodate bulk quantities of data such as vibration waveforms. Such vibration monitoring systems are not well suited for operation in a control protocol network.

In accordance with one embodiment disclosed herein, a measurement instrument has a sensor circuit for sensing a parameter of a machine and producing a dynamic signal based on the sensed parameter. An analog to digital converter is connected to receive the dynamic signal and convert the dynamic signal to a digital format, producing a digital signal having a plurality of data points. A processor is connected to receive the digital signal and determines a characteristic or characteristics of the dynamic signal. Characteristic is used herein to refer to values representing information about the dynamic signal such as root-mean-square value, peak value, frequency value, peak in frequency range, and the like. The processor also determines data corresponding to the characteristic or characteristics such as a level corresponding to the absolute peak of the digital signal over a predetermined range of data points of the digital signal. A power supply is connected to power the processor and is controlled by the processor to manage efficiently power consumption. The power supply may be a long-life, non-rechargeable battery or may be a rechargeable battery with a solar power supply for charging the battery. Alternatively, the power supply may be a power circuit connected to an outside source of power.

In some embodiments, the processor produces a PeakVue waveform as discussed in U.S. Pat. No. 5,895,857 to Robinson et al. (the '857 patent), which is incorporated in its entirety herein by reference. The PeakVue waveform is made up of many levels corresponding to the absolute peaks of different sequential sections of the digital signal and a single absolute peak level is determined over a time interval sufficient to include eleven or more shaft revolutions.

In other embodiments, the processor determines a true root-mean-square value representing the overall vibration level in velocity units which is an indicator of the condition of the machine.

In other embodiments, the measurement instrument has a communication module and a communication processor controls the communication module. A communication power supply is connected to the communication processor and powers the communication processor, and an antenna is connected to the communication processor for wirelessly communicating the peak level and the overall RMS level to a control protocol network, such as a HART or a Fieldbus protocol network. Some embodiments of the instrument have multiple sensors for measuring vibration or relatively steady-state measurements such as temperature and pressure.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

A low power vibration sensor and wireless transmitter system has one or more sensor inputs to measure conditions such as vibration on one or more sensors. Also, the system is capable of making one or more steady state or DC measurements of conditions such as temperature and pressure. In one embodiment, the system is self-contained without hardwired power or communication connections and communicates over a wireless, self-configuring daisy-chain network.

Generally, the signal generated from a vibration sensor, such as an industrial accelerometer has about a 100-120 dB dynamic range with a frequency bandwidth of about 20 kHz to about 30 kHz. To convert a signal generated by such an accelerometer into a digital signal capable of wireless transmission typically would require a 24-bit analog to digital converter sampling at about 100,000 to 200,000 samples per second. This system 10 breaks the signal into two pieces: a low frequency range (about 1-2 kHz) and a high frequency range. The high frequency range portion is compressed using PeakVue technology as described below. This allows the resolution of the signal to be reduced to about 12 to 16 bits and the bandwidth may be reduced to about 1-2 kHz. As discussed below, two vibration data points representing characteristics are transmitted, and therefore, the communication and power requirements of the system 10 are greatly reduced as opposed to a system transmitting blocks of data.

Figure 1:
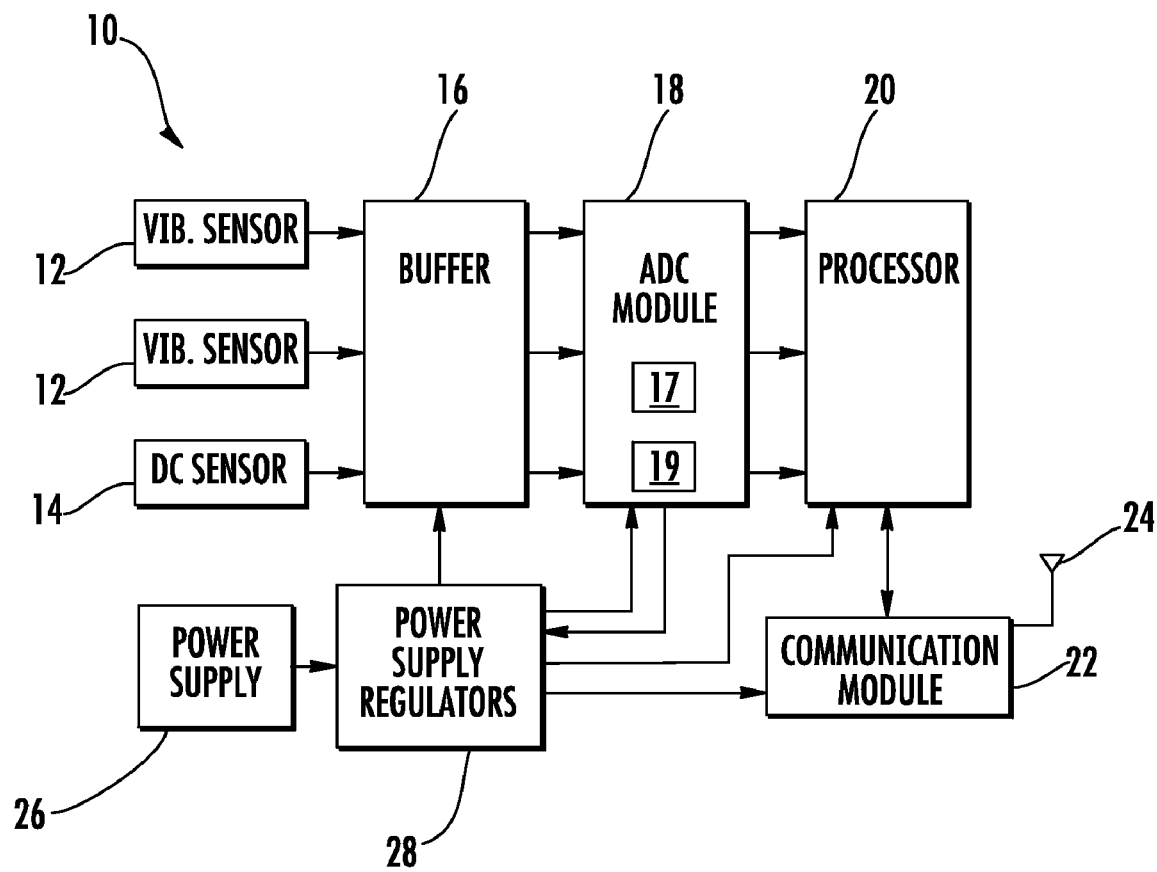
FIG. 1 is a diagram of the low power vibration measurement and wireless transmitter system.

Referring to FIG. 1, one embodiment of the system 10 is shown. In this embodiment, two vibration sensors 12 are connected to a buffer 16. In other embodiments, no initial buffer 16 is used. A DC sensor, such as a temperature sensor is also connected to the buffer 16. The number of vibration sensors 12 and DC sensors 14 may vary, for example, three vibration sensors 12 and two DC sensors 14 may be connected to the buffer 16. The buffer 16 is connected to an analog to digital converter (ADC) module 18, which may include one or more analog to digital converters. The ADC module 18 is connected to a processor 20, which is connected to a communication module 22. The communication module 22 is connected to an antenna 24 for communicating on a wireless network. The system 10 is powered by a power supply 26, and the power is regulated by power supply regulators 28 connected to the power supply 26, the buffer 16, the ADC module 18, the processor 20, and the communication module 22.

The ADC module 18 includes at least one analog to digital converter 17, which converts the analog signals generated by the vibration sensors 12 to digital signals. The analog to digital converter 17 typically has a large amplitude dynamic range of at least about 98 dB and typically about 103 dB. Also, the analog to digital converter 17 has a frequency range of about 2 Hz to about 48 kHz. A sample rate of about 96 kHz is used in the preferred embodiment. A second analog to digital converter 19 digitizes the analog signals generated by the DC sensors 14. The second analog to digital converter 19 also converts several internal voltages such as some power supply voltages and sensor bias voltages for the purpose of online diagnostic monitoring of the system 10. In the preferred embodiment, the second analog to digital converter 19 is a 12-bit ADC. The digital signals generated by the ADC module 18 are sent to the processor 20.

The processor 20 is preferably a digital signal processor having a hybrid characteristic. That is, the processor 20 of the preferred embodiment is a digital signal processor that also has multiple peripheral input/output ports. Additionally, the processor 20 consumes a low amount of power while in an ON state and also a very low amount of power while in a standby or hibernation state as discussed below.

The power supply 26 may be a battery that provides power up to several years without needing replacement. The low power characteristics of the ADC module 18 and the processor 20 allow such a long period of single battery use. Alternatively, the power supply 26 may be a solar power supply. A solar power supply is a solar panel connected to a lead acid battery and allows for 24 hour-a-day operation by recharging the lead acid battery during light hours. The power supply is controlled by the processor 20 in order to hold power consumption of the system 10 to a minimum.

The processor 20 communicates with the communication module 22, which in one embodiment is an Emerson radio module designed by Dust Networks, Inc. The communication module 22 has a processor with its own wakeup and sleep schedule independent of the system processor 20 and the rest of the system 10. In one embodiment, the network with which the system 10 communicates is a self-configuring radio network with a range of about 250 ft to about 300 ft.

Figure 2:
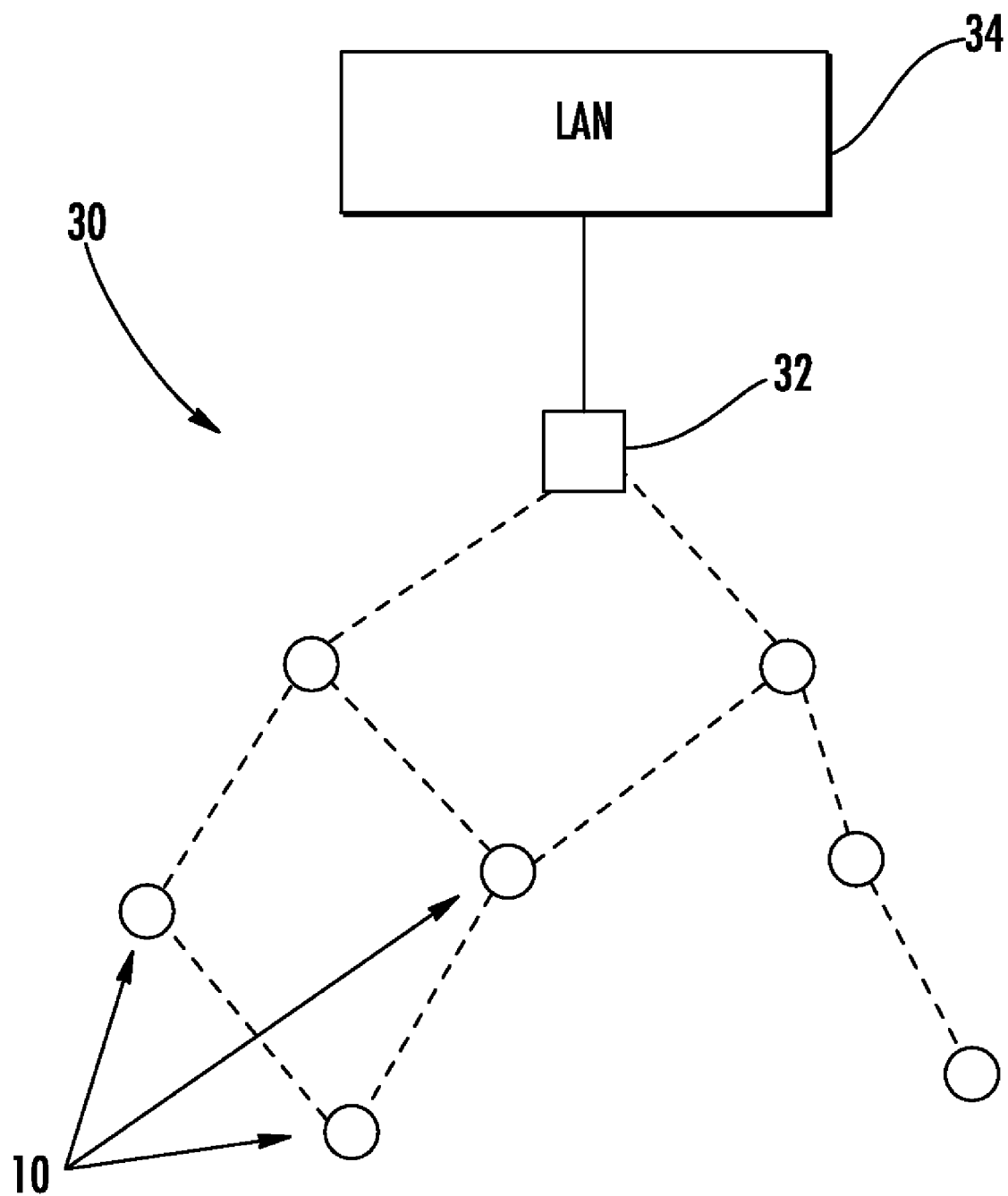
FIG. 2 is a diagram of the wireless network of daisy-chain systems.

Referring now to FIG. 2, a network 30 is shown. One or more systems 10 are connected in a wireless daisy-chain configuration whereby the communication modules 22 of each system 10 communicate with one another and self configure a communication network. Each system's communication module 22 wakes-up for about 30 milliseconds every 1 second in order to configure the network and communicate data along the daisy-chain network. The data from each system 10 is forwarded from communication module 22 to communication module 22 until it reaches the main gateway 32. The main gateway is connected to a local area network 34 such as the Ethernet computer network of a plant. The communication modules 22 awaken periodically regardless of whether the system 10 has collected new data needing transmission along the network 30. This is so that the communication module 22 may self configure and participate in the daisy-chain network 30 for communicating data to the main gateway and ultimately the LAN 34. In one embodiment, the data in the network 30 is formatted using the HART protocol and in an alternative embodiment, the data is formatted using the Fieldbus protocol.

In many applications, a vibration measurement is taken only once per day or once per hour. However, other measurements, such as pressure or temperature, may be taken every second or every 10 seconds. The system 10 communication module 22 can accommodate a variety of measurement types because it has its own processor apart from the system processor 20. Furthermore, the communication module 22 is continuously powered by the power supply 26. That is, the power sent to the communication module 22 is not controlled by the system processor 20, but rather is continuously connected. Thus, regardless of the frequency with which the system 10 awakens to make measurements, the communication module 22 is continuously powered and controlled by its own processor 20 in order to operate on the network 30.

The measurement system (portion of the system 10 not including the communication module 22) wakes up from sleep or hibernation periodically and makes one or more measurements, typically on a predetermined schedule separate and distinct from the sleep and wake-up schedule of the communication module 22. Such measurements may include an overall vibration energy measurement and a high frequency PeakVue measurement derived from a time waveform. Once one or more measurements are taken, the system processor 20 awaits the next communication module 22 wake-up cycle, which in one embodiment occurs every 1 second. The system processor 20 then sends the communication module 22 the measurement data to a buffer in the communication module 22. Once the data is loaded into the communication module's 22 buffer, the system processor 20 returns the measurement system to a hibernation state until the next measurement is scheduled. The communication module's 22 processor then controls communication of the measurement data across the network 30 and to the main gateway 32.

When making vibration measurements, overall velocity vibration, with a frequency bandwidth of about 2 Hz to about 1 kHz is measured and a root-mean-square (RMS) is calculated in inches per second. Also, a peak g-level measured in gravitational units or "g's" is measured for frequencies greater than about 1 kHz for an observation period exceeding about 10 cycles or revolutions. The peak g-level, extracted from a PeakVue time waveform as discussed in the '857 patent, bandwidth ranges from about 1 kHz to the limit of the vibration sensor being used. Typically, the upper bandwidth limit of a vibration sensor such as an ICP or a 3-wire type is about 20 kHz.

Figure 3A:
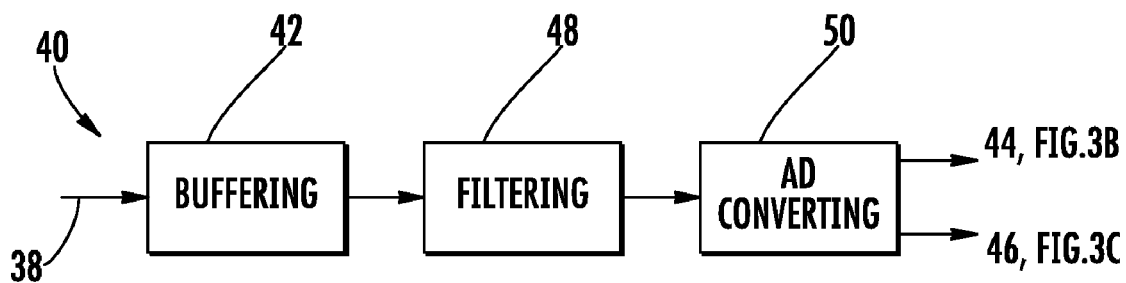
FIGS. 3A-3C are flowcharts of the vibration signal processing to determine a PeakVue waveform including peak levels and a true RMS value.
Figure 3B:
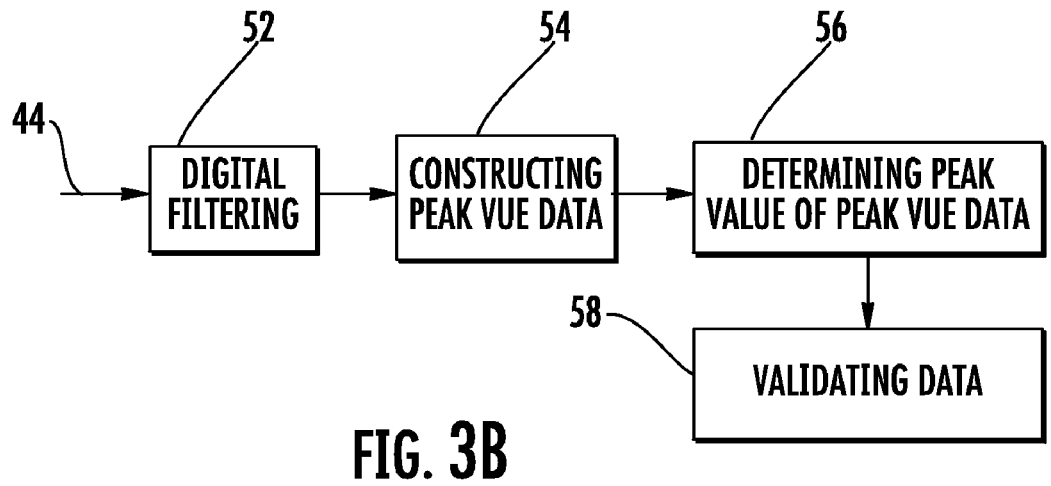
Figure 3C:
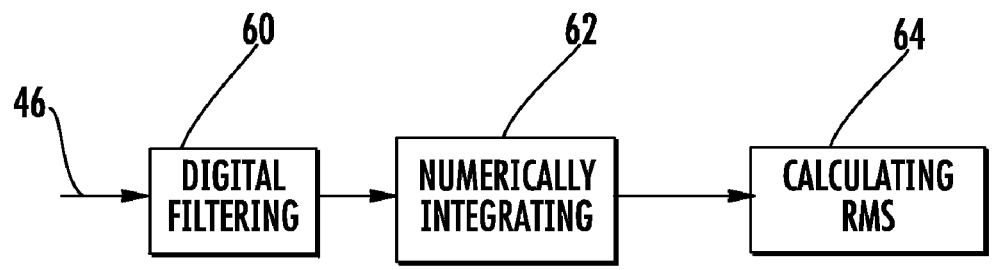

Referring now to FIGS. 1 and 3A, a flowchart illustrates a vibration measurement 40 taken and processed by one embodiment of the system 10. First, a measurement is taken by a vibration sensor 12, such as an accelerometer. The vibration sensor generates an electrical AC signal corresponding to the vibration measurement and that signal is sent at step 42 to an optional buffer 16 and is represented by arrow 38. At step 48, the signal is filtered by a high pass filter that in some embodiments is part of the ADC module 18. The high pass filter preferably filters and removes signal components less than about 2 Hz. At step 50, the signal is converted from an analog signal to a digital signal by an ADC 17 in the ADC module 18 (FIG. 1). Preferably, the analog to digital converter 17 produces about 100,000 samples per second resolution. Next, a PeakVue calculation is performed on the digital signal, as illustrated in FIG. 3B, and an RMS calculation is performed on the digital signal as illustrated in FIG. 3C. Such calculations are performed in the processor 20 (FIG. 1).

Referring now to FIG. 3B, at step 52 the digitized signal represented by arrow 44 is digitally filtered by a digital high or band pass filter. The filter may be part of the ADC module 18 or the processor 20 (FIG. 1). Next, a PeakVue data block is constructed at step 54 and a peak value from the PeakVue data block is determined at step 56. Several PeakVue data blocks may be constructed (step 54) and peak values from each determined (step 56) in order to verify or validate the accuracy of the peak value(s). For example, three PeakVue data blocks may be constructed (step 54) and the peak values determined (step 56) from each are examined in order to remove any unreasonable low or high spikes in the signal. Once any unreasonable low or high spikes in the signal are removed, the remaining peak values may be averaged or one may be chosen to represent the group. Once a peak value is validated using the process discussed above as represented by step 58, it is sent to the communication module 22 (FIG. 1) where it is stored in the communication module's buffer until it is transmitted over the network 30.

In summary, a vibration time waveform is measured and a number of peak amplitude values are determined. A peak value may represent a machine fault. In one embodiment, three peak amplitude values are determined. These transient peaks of the waveform may, however, represent an unwanted characteristic such as a lightning strike. This can be deceiving, and therefore, the peak amplitude values are compared and an extremely high or low peak may be eliminated from consideration. Also, the peak amplitude values may be averaged to minimize the effect of potentially misleading occurrences. Such signal analysis is configurable in the firmware of the system 10.

For example, a PeakVue time waveform is captured for a time sufficient to capture several revolutions, for example twelve revolutions. In other embodiments, a different number of revolutions are captured. Generally, the "peak g-level" is the characteristic of interest in the PeakVue time waveform for vibration analysis. However, in some applications, a fast Fourier transform is performed on the PeakVue time waveform at the same time or subsequent to the peak g-level calculation. The PeakVue waveform remains available for processing in addition to the initial peak g-level or FFT processing. Also, in some embodiments, neither the peak g-level or FFT is calculated, but rather, another data analysis algorithm is performed on the PeakVue waveform.

Referring to the peak g-level determination, as discussed above, the signal is filtered at step 48 by a passive high-pass filter. Next, the signal is compressed or digitized at step 50 by the ADC module 18. In this example, the signal is sampled at a high rate of about 2.56 samples times 40 kHz or about 102,400 samples per second. Then the signal is digitally filtered at step 52 by a high or band pass filter that in some embodiments is part of the ADC module 18 and in other embodiments is part of the processor 20. At this point, the signal is compressed to an effectively lower bandwidth. The lower bandwidth is limited by the high pass filter employed at step 52. Assuming the lower bandwidth selected is 1,000 Hz, the data compression is accomplished by decimation as represented by step 56. That is, the first data point in the PeakVue time waveform is selected to be the maximum absolute "g-level" or peak amplitude value in the first 40 data points in the high sample rate signal. The number of data points (40 in this example) is determined by 40,000 Hz/1,000 Hz. The second data point in the PeakVue time waveform is the maximum absolute "g-level" in the next 40 points and so on until the PeakVue time waveform is complete. The number of data points in the PeakVue time waveform is generally the factor (2.56) times the user-specified number of lines selected to ensure a sufficient number of captured revolutions.

In some embodiments, multiple PeakVue waveforms are constructed, for example three PeakVue waveforms are constructed, each representing characteristics of the digital signal. The multiple PeakVue waveforms are then compared by a comparison circuit or the processor and an error-removing algorithm is performed. In one embodiment, three PeakVue waveforms are constructed, peak g-level values are determined for each of the three PeakVue waveforms, and the arithmetic mean of the three peak g-level values is determined and subsequently communicated to the network 30 as the useful data value. In other embodiments, different error-removing algorithms are performed including determining multiple peak g-level values, eliminating outlying values, calculating the arithmetic mean of those remaining, and communicating the resulting data value to the network 30.

Referring now to FIG. 3C, the digitized signal represented by arrow 46 is digitally filtered at step 60 by a digital low pass filter that filters at about 1 kHz. In some embodiments, the digital low pass filter is part of the processor 20 (FIG. 1). Next, the signal is numerically integrated at step 62 by the processor 20 (FIG. 1) to obtain a velocity waveform. This numerical integration at step 62 typically requires a settling time before constructing the velocity data block. In one embodiment, oversampling is used in the numerical integration at step 62 and provides an acceptable approximation of a continuous integration if a sampling factor of at least about ten is used. The time in the velocity data block should be sufficient to capture ten or more revolutions of the machine. Next, the processor 20 (FIG. 1) uses the velocity data block to calculate an overall RMS value at step 64. Once the RMS value is calculated, it is sent to the buffer of the communication module 22 where it awaits transmission over the network 30. The resulting RMS value is calculated in inches per second over a bandwidth of about 2 Hz to about 1 kHz. Also, in some embodiments, a fast Fourier transform or other calculation may be performed on the data at the location of the system 10 concurrent or subsequent to the initial RMS or FFT calculation. In some embodiments, neither the RMS or FFT calculations are performed, but rather, other algorithms are performed on the velocity waveform.

The RMS calculation can be performed "on the fly." This means that the data waveform is not stored in order to later calculate the RMS or, in some cases, the fast Fourier transform. Normally, in order to calculate a true AC RMS value, data must be stored. This is because the DC offset must be determined at the end of the calculated in order to calculate the true RMS. However, if intermediate values of the RMS calculation are stored and combined at the end of the calculation, the DC offset is inherently removed from the RMS value without the need for determining the DC offset at the end of the calculation and adjusting the RMS value accordingly. Thus, the "on the fly" RMS calculation conserves system 10 resources such as memory and power.

To minimize power consumption in the system 10, preferably, a 3-wire type accelerometer that requires about 2.5 mWatts is used as a vibration sensor in order to minimize power consumption. Alternatively, an ICP accelerometer requires about 40-48 mWatts. Also, the ADC module's 18 main analog to digital converter used for the vibration signals is preferably a low power (about 36 mWatts) 24-bit sigmadelta converter that samples at about 100,000 samples per second. Additionally, the processor 20 in one embodiment is an Analog Devices BF533 that uses about 2.6 mWatts when in an active mode. As discussed above, both the ADC module 18 and the processor 20 have hibernation modes to further conserve power. However, the non-digital components such as the sensors and the analog buffer circuit typically do not have hibernation modes, but the analog buffer circuit only requires about 2.5-5 mWatts of power for operation.

The system 10 is very versatile in the measurements that may be taken and the calculations performed due to the nearly all digital design. Further, working from a low-duty cycle coupled with the low power instruments allows the system 10 to be a very low power device. The nearly all digital design and low power character of the system 10 leads to a very small, but flexible system 10 housed in one box.

The foregoing description of preferred embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A measurement instrument for communicating over a control protocol network, the control protocol network configured to transfer control protocol data in a control protocol to and from at least one gateway, the measurement instrument comprising:

a sensor circuit for sensing a parameter of a machine and producing a dynamic signal based on the sensed parameter;

an analog to digital converter for receiving the dynamic signal and for converting the dynamic signal to a digital signal having a plurality of data points;

a digital filtering circuit for splitting the digital signal into a first filtered signal having a first frequency range bounded by a first lower frequency and a first upper frequency, and a second filtered signal having a second frequency range bounded by a second lower frequency and a second upper frequency, where the first lower frequency is less than the second lower frequency and the first upper frequency is less than the second upper frequency;

a processor connected to receive the first filtered signal and the second filtered signal and configured for:

determining one or more peak amplitude levels of the second filtered signal over the second frequency range and producing peak amplitude level data in the control protocol, the peak amplitude level data representing the one or more determined peak amplitude levels, integrating the first filtered signal over the first frequency range resulting in an integrated signal; and determining a root-mean-square value from the integrated signal and producing root-mean-square data in the control protocol, the root-mean-square data corresponding to the root-mean-square value; and a communication module for communicating the peak amplitude level data and the root-mean-square data over the control protocol network.

2. The measurement instrument of claim 1 wherein the communication module comprises:

a. a communication processor for controlling the communication module;

b. a communication power supply connected to power the communication processor; and c. an antenna connected to the communication processor and for wirelessly communicating the peak amplitude level data and the root-mean-square data over the control protocol network.

3. The measurement instrument of claim 1 wherein the control protocol network is selected from the group consisting of a HART protocol network and a Fieldbus protocol network.

4. The measurement instrument of claim 1 wherein the sensor circuit comprises a vibration sensor, the parameter is vibration of a machine and the dynamic signal is based at least in part on the sensed vibration.

5. The measurement instrument of claim 1 wherein the sensor circuit comprises a buffer for temporarily storing parameter data corresponding to at least one of the sensed parameter and the dynamic signal.

6. The measurement instrument of claim 1 wherein the second lower frequency is about two kilohertz and the first upper frequency is about two kilohertz.

7. The measurement instrument of claim 1 wherein the second lower frequency is about one kilohertz and the first upper frequency is about one kilohertz.

8. The measurement instrument of claim 1 wherein the digital filtering circuit comprises:

a low pass filter for filtering the digital signal resulting in the first filtered signal having the first frequency range; and a high pass filter for filtering the digital signal resulting in the second filtered signal having the second frequency range.

9. The measurement instrument of claim 1 wherein the analog to digital converter comprises the digital filtering circuit.

10. The measurement instrument of claim 1 wherein the processor comprises the digital filtering circuit.

11. The measurement instrument of claim 1 further comprising a power supply connected to power at least the communication module and the processor and wherein the communication module comprises a communication processor for periodically cycling the communication module between a hibernation state wherein the communication module is not participating in the control protocol network and an awake state wherein the communication module is participating in the control protocol network where participating in the control protocol network includes at least communicating the peak amplitude level data and the root-mean-square data.

12. The measurement instrument of claim 1 wherein the processor produces a peak level waveform comprising a plurality of peak amplitude levels each corresponding to one of a plurality of predetermined, non-overlapping ranges of data points of the second filtered signal.

13. The measurement instrument of claim 12 wherein the processor determines an overall peak amplitude level from the one or more determined peak amplitude levels of the peak level waveform and produces overall peak amplitude level data in the control protocol representing at least the overall peak amplitude level and wherein the peak amplitude level data includes the overall peak amplitude level data.

14. The measurement instrument of claim 1 further comprising:
- a second sensor circuit for sensing a second parameter of the machine and producing a second dynamic signal based on the sensed second parameter;
- a second analog to digital converter connected to receive the second dynamic signal and for converting the second signal to a second digital signal having a plurality of data points; and
- a second digital filtering circuit for splitting the second digital signal into a third filtered signal having a third frequency range bounded by a third lower frequency and a third upper frequency, and a fourth filtered signal having a fourth frequency range bounded by a fourth lower frequency and a fourth upper frequency, where the third lower frequency is less than the fourth lower frequency and the third upper frequency is less than the fourth upper frequency.

15. The measurement instrument of claim 14 wherein the second sensor circuit comprises a temperature, sensor for sensing a temperature of the machine and the second dynamic signal corresponds to the sensed temperature.

16. The measurement instrument of claim 14 wherein the second sensor circuit comprises a pressure sensor for sensing a pressure of the machine and the second dynamic signal corresponds to the sensed pressure.

17. The measurement instrument of claim 1 wherein the analog to digital converter converts the dynamic signal to the digital signal by sampling the dynamic signal at a rate of at least about 100,000 samples per second.

18. The measurement instrument of claim 17 wherein the analog to digital converter is configured for conversion at a twenty-four bit resolution.

19. The measurement instrument of claim 18 wherein the processor integrates the first filtered signal in the time domain.

20. A measurement instrument for communicating over a control protocol network, the control protocol network configured to transfer control protocol data in a control protocol to and from at least one gateway, the measurement instrument comprising:
- a. a sensor circuit for sensing a parameter of a machine and producing a dynamic signal based on the sensed parameter;
- b. an analog to digital converter for receiving the dynamic signal and for converting the dynamic signal to a digital signal by sampling the dynamic signal at a rate of at least about 100,000 samples per second and at a twenty-four bit resolution;
- c. a digital filtering circuit for splitting the digital signal into a first filtered signal having a first frequency range bounded by a first lower frequency and a first upper frequency of about one kilohertz, and a second filtered signal having a second frequency range bounded by a second lower frequency of about one kilohertz and a second upper frequency, wherein the first lower frequency is less than the first upper frequency and the second lower frequency is less than the second upper frequency;
- d. a processor connected to receive the first filtered signal and the second filtered signal and configured for:
  - i. producing a peak level waveform comprising a plurality of peak amplitude levels each corresponding to one of a plurality of predetermined, non-overlapping ranges of data points of the second filtered signal,
  - ii. determining an overall peak amplitude level from the peak amplitude levels of the peak level waveform,
  - iii. producing overall peak amplitude level data in a control protocol representing the overall peak amplitude level,
  - iv. integrating the first filtered signal in the time domain over a second predetermined range of data points resulting in an integrated signal and
  - v. determining a root-mean-square value from the integrated signal and producing root-mean-square data in the control protocol corresponding to the root-mean-square value;
- e. a power supply connected to power the processor and controlled by the processor to efficiently manage power consumption; and
- f. a communication module for communicating the level data and the root-mean-square data over the control protocol network.

21. A method for communicating control protocol data indicating a machine condition over a control protocol network, the control protocol network configured to transfer the control protocol data in a control protocol to and from at least one gateway, the method comprising:
- a. sensing a parameter of the machine;
- b. producing a dynamic signal based on the sensed parameter;
- c. converting the dynamic signal to a digital signal having a plurality of data points;
- d. splitting the digital signal into a first filtered signal having a first frequency range and a second filtered signal having a second frequency range, the first frequency range having a first lower frequency and a first upper frequency, the second frequency range having a second lower frequency and a second upper frequency, where the first lower frequency is less than the second lower frequency and the first upper frequency is less than the second upper frequency;
- e. determining a peak amplitude level of the second filtered signal over the second frequency range and producing peak amplitude level data in the control protocol, the peak amplitude level data representing the determined peak amplitude level;
- f. integrating the first filtered signal over a second predetermined range of data points resulting in an integrated signal;
- g. determining a root-mean-square value from the integrated signal and producing root-mean-square data in the control protocol corresponding to the root-mean-square value; and
- h. communicating the peak amplitude level data and the root-mean-square data over the control protocol network.

* * * * *